(12) United States Patent
Kanie et al.

(10) Patent No.: US 10,103,679 B2
(45) Date of Patent: Oct. 16, 2018

(54) INVERTER UNIT

(71) Applicant: KABUSHIKI KAISHA TOYOTA JIDOSHOKKI, Kariya-shi, Aichi (JP)

(72) Inventors: Naohito Kanie, Kariya (JP); Kazuyoshi Kontani, Kariya (JP); Naotaka Matsumoto, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 0 days.

(21) Appl. No.: 15/382,964

(22) Filed: Dec. 19, 2016

(65) Prior Publication Data

US 2017/0187320 A1   Jun. 29, 2017

(30) Foreign Application Priority Data

Dec. 24, 2015   (JP) ................................ 2015-252000

(51) Int. Cl.
*H02P 6/14* (2016.01)
*H02M 7/48* (2007.01)
*H02P 29/68* (2016.01)
*H02P 27/08* (2006.01)
*H02M 1/32* (2007.01)
(Continued)

(52) U.S. Cl.
CPC ............. *H02P 29/68* (2016.02); *H02M 1/32* (2013.01); *H02M 7/5395* (2013.01); *H02P 27/08* (2013.01); *H02M 2001/0032* (2013.01); *H02M 2001/0054* (2013.01); *H02M 2001/327* (2013.01); *Y02B 70/1491* (2013.01); *Y02B 70/16* (2013.01)

(58) Field of Classification Search
CPC .................................. B60L 15/025; B60L 3/04
See application file for complete search history.

(56) References Cited

U.S. PATENT DOCUMENTS

| 2009/0256506 A1* | 10/2009 | Sakai | ........................ H02P 6/14 |
| | | | 318/400.09 |
| 2010/0214809 A1 | 8/2010 | Iwashita et al. | |
| 2014/0028238 A1 | 1/2014 | Tsukamoto et al. | |

(Continued)

FOREIGN PATENT DOCUMENTS

| JP | 5-115106 A | 5/1993 |
| JP | 2002-010668 A | 2/2002 |

(Continued)

OTHER PUBLICATIONS

Communication dated May 17, 2017 from the European Patent Office in counterpart Application No. 16198427.3.

(Continued)

*Primary Examiner* — Bickey Dhakal
*Assistant Examiner* — Charles S Laughlin
(74) *Attorney, Agent, or Firm* — Sughrue Mion, PLLC

(57) ABSTRACT

An inverter unit includes a first temperature detector that detects a first temperature of at least one of semiconductor elements and a periphery of the semiconductor elements, current detectors that detect a current of a motor, and a controller that switches a modulation mode of the motor to a two-phase modulation mode or a three-phase modulation mode on the basis of a detection result of the first temperature by the first temperature detector and detection results of the current by the current detectors.

6 Claims, 6 Drawing Sheets

(51) Int. Cl.
*H02M 7/5395* (2006.01)
*H02M 1/00* (2006.01)

(56) References Cited

U.S. PATENT DOCUMENTS

| | | | |
|---|---|---|---|
| 2014/0265975 A1* | 9/2014 | Holmes | B60L 15/20 318/452 |
| 2015/0108929 A1 | 4/2015 | Nobe et al. | |
| 2016/0126877 A1* | 5/2016 | Endoh | H02P 29/64 318/400.02 |

FOREIGN PATENT DOCUMENTS

| | | |
|---|---|---|
| JP | 2003-126584 A | 5/2003 |
| JP | 2003-199381 A | 7/2003 |
| JP | 2004-48885 A | 2/2004 |
| JP | 2014-222967 A | 11/2004 |
| JP | 2006-174591 A | 6/2006 |
| JP | 2007-137231 A | 6/2007 |
| JP | 2007-288858 A | 11/2007 |
| JP | 2008-104327 A | 5/2008 |
| JP | 2009-89534 A | 4/2009 |
| JP | 2010-158088 A | 7/2010 |
| JP | 2011-229304 A | 11/2011 |
| JP | 2012-135119 A | 7/2012 |
| JP | 2012-222925 A | 11/2012 |
| JP | 2012-222949 A | 11/2012 |
| WO | 2015/063957 A1 | 5/2015 |

OTHER PUBLICATIONS

Communication dated Mar. 6, 2018 from the Japanese Patent Office in counterpart application No. 2015-252000.
Communication dated Jun. 4, 2018, from the European Patent Office in counterpart European Application No. 16198427.3.

* cited by examiner

INVERTER UNIT

TECHNICAL FIELD

The present invention relates to an inverter unit.

BACKGROUND

As an inverter unit according to the related art, for example, a unit described in Japanese Unexamined Patent Publication No. 2007-288858 is known. The inverter unit described in Japanese Unexamined Patent Publication No. 2007-288858 includes a switching element that converts a DC voltage into an AC voltage by switching the DC voltage and supplies three AC voltages to phases of a three-phase motor. The inverter unit includes a temperature detector that detects a temperature of the switching element and a line-to-line modulation controller that switches a modulation mode between a three-phase line-to-line modulation mode in which all supply voltages to three phases of the three-phase motor are switched in parallel and a two-phase line-to-line modulation mode in which only supply voltages to two phases of the three-phase motor are switched in parallel for each period of a predetermined electrical angle by controlling the switching element on the basis of the temperature detected by the temperature detector.

In the inverter unit according to the related art, the temperature of the switching element is detected and the three-phase line-to-line modulation mode is switched to the two-phase line-to-line modulation mode when the detected temperature is equal to or higher than a predetermined temperature. In the inverter unit, since a switching loss decreases when the modulation mode is switched, overheating of the switching element is prevented. However, when the modulation mode is switched from the three-phase line-to-line modulation mode to the two-phase line-to-line modulation mode, an output of the motor decreases.

An object of an aspect of the present invention is to provide an inverter unit that can protect a semiconductor element while securing an output of a motor.

SUMMARY

According to an aspect of the present invention, there is provided an inverter unit that converts DC power from a battery into AC power using a semiconductor element and supplies the AC power to a three-phase motor, the inverter unit including: a first temperature detector that detects a first temperature of at least one of the semiconductor element and a periphery of the semiconductor element; a current detector that detects a current of the motor; and a controller that switches a modulation mode of the motor to a two-phase modulation mode or a three-phase modulation mode on the basis of a detection result of the first temperature by the first temperature detector and a detection result of the current by the current detector.

In the inverter unit according to the aspect of the present invention, the first temperature of at least one of the semiconductor element and the periphery of the semiconductor element and the current of the motor are detected. The controller switches the modulation mode of the motor to the two-phase modulation mode or the three-phase modulation mode on the basis of two parameters of the detection result of the first temperature by the first temperature detector and the detection result of the current by the current detector. In the inverter unit according to the related art, for example, when the first temperature is equal to or higher than a predetermined temperature and the current is small, the modulation mode is switched to the two-phase modulation mode and thus the output of the motor decreases. In the inverter unit according to the present invention, for example, when the first temperature is relatively high and the current is small, the motor is driven in the three-phase modulation mode. Accordingly, it is possible to maintain the output of the motor. In the inverter unit, when the first temperature increases, the modulation mode is switched to the two-phase modulation mode and it is thus possible to prevent overheating of the semiconductor element. In this way, in the inverter unit, it is possible to protect the inverter unit while securing the output of the motor.

In an embodiment, the controller may set a carrier frequency of a carrier signal which is used to drive the semiconductor element to be lower than a reference frequency when a value of the first temperature detected by the first temperature detector is equal to or higher than a predetermined threshold value. By setting the carrier frequency to be lower, a loss in the semiconductor element decreases. Accordingly, it is possible to decrease the first temperature.

In an embodiment, the controller may set the carrier frequency to be in an audible frequency band. When the carrier frequency is set to be in the audible frequency band, a so-called chopper sound is generated in the inverter unit. An operator hearing the chopper sound can see, for example, that the first temperature of the semiconductor element is increasing. In this way, by setting the carrier frequency to be in the audible frequency band, it is possible to notify that the first temperature of the semiconductor element is increasing.

In an embodiment, the inverter unit may further include a capacitor that is connected in parallel to the battery on an input side of the semiconductor element and a second temperature detector that detects a second temperature of at least one of the capacitor and a periphery of the capacitor, and the controller may set the carrier frequency to be higher than a reference frequency when a value of the second temperature detected by the second temperature detector is equal to or lower than a predetermined threshold value. When the temperature of the capacitor is low, equivalent series resistance (ESR) thereof is large. Accordingly, when the temperature of the capacitor is low, a smoothing effect by the capacitor is reduced and thus a surge voltage at the time of switching of the semiconductor element increases. Accordingly, the semiconductor element may be subjected to damage or the like. In the embodiment, when the second temperature is equal to or lower than the threshold value, the carrier frequency is set to be higher. Accordingly, a loss in the semiconductor element increases and the temperature of the semiconductor element increases. As a result, the temperature of the capacitor can be increased. Accordingly, it is possible to prevent reduction of the smoothing effect by the capacitor. As a result, it is possible to prevent damage or the like of the semiconductor element.

In an embodiment, the inverter unit may further include a capacity detector that detects a capacity of the battery, and the controller may set the carrier frequency to be lower than the reference frequency when a value of the capacity of the battery detected by the capacity detector is equal to or less than a predetermined threshold value. Accordingly, when the capacity of the battery decreases, it is possible to achieve reduction of a loss in the semiconductor element. Accordingly, it is possible to prevent a decrease in the capacity of the battery. As a result, it is possible to achieve extension of an operating time of the battery.

According to the aspect of the present invention, it is possible to protect a motor while securing an output of the motor.

DETAILED DESCRIPTION

Figure 1:
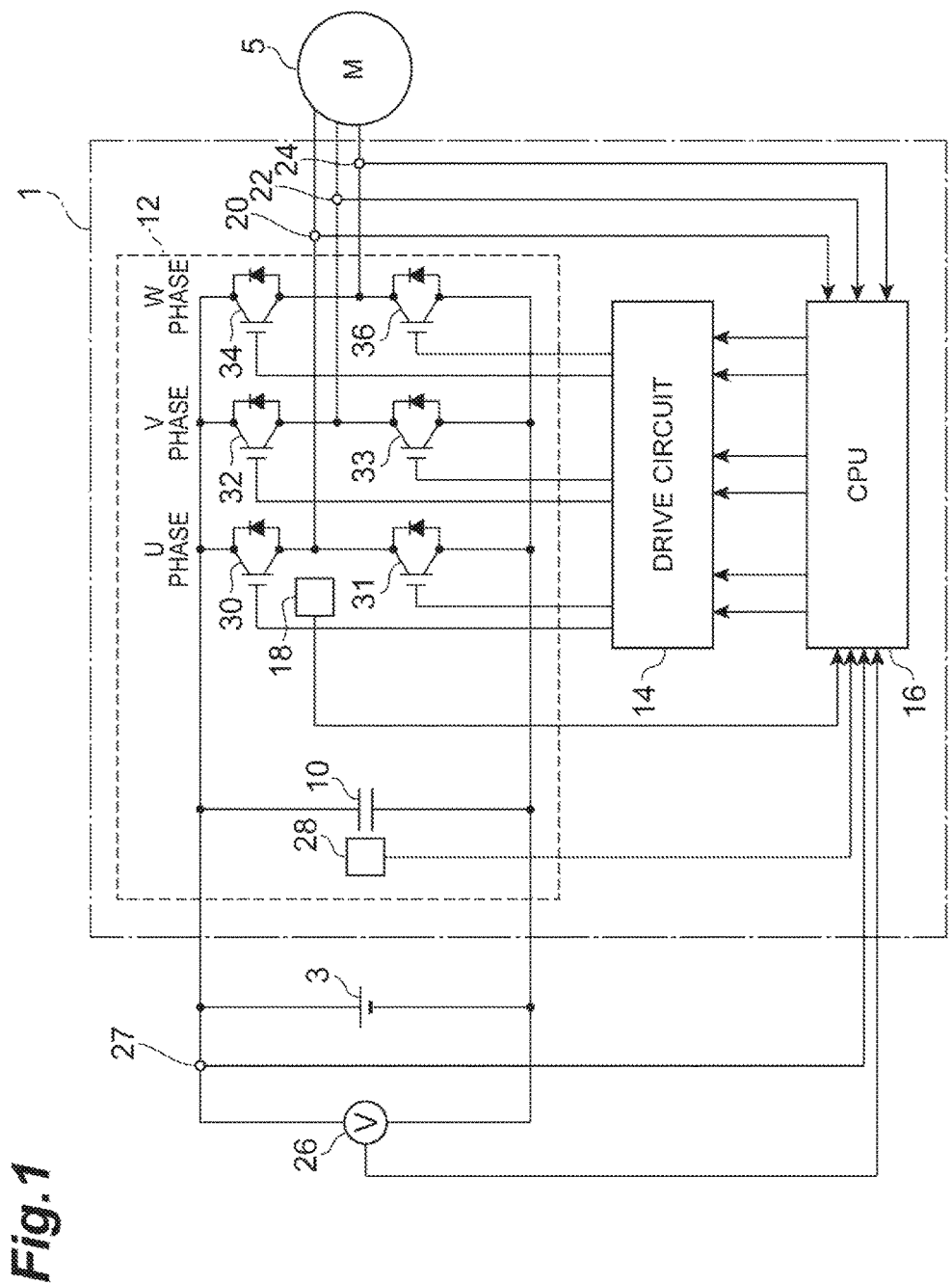
FIG. 1 is a circuit diagram of a power supply circuit including an inverter unit according to an embodiment.

Hereinafter, an embodiment of the present invention will be described in detail with reference to the accompanying drawings. In the drawings, equivalent or corresponding elements will be referenced by the same reference signs and description thereof will not be repeated.

FIG. 1 is a circuit diagram illustrating a power supply circuit including an inverter unit according to an embodiment. The inverter unit 1 illustrated in FIG. 1 converts DC power from a battery 3 into AC power, supplies the AC power to a motor 5 which is a rotary electrical machine, and drives the motor 5. The power supply circuit is mounted in a vehicle such as a forklift.

As illustrated in FIG. 1, the inverter unit 1 includes a capacitor 10, an inverter circuit 12, a drive circuit 14, a CPU (a controller) 16, a first temperature sensor (a first temperature detector) 18, a first current sensor (a current detector) 20, a second current sensor 22, a third current sensor 24, a voltage sensor (a capacity detector) 26, a fourth current sensor (a capacity detector) 27, and a second temperature sensor (a second temperature detector) 28.

The capacitor 10 is connected in parallel to a DC power source 2 on the input side of the inverter circuit 12. The capacitor 10 is a smoothing capacitor. The capacitor 10 is, for example, an electrolytic capacitor. The capacitor 10 is mounted, for example, on a capacitor board which is not illustrated.

The inverter circuit 12 includes two switching elements (semiconductor elements) 30 and 31, two switching elements 32 and 33, and two switching elements 34 and 35 for each phase. The switching elements 30 to 36 are, for example, bipolar transistors such as metal-oxide-semiconductor field-effect transistors (MOSFETs), insulated gate bipolar transistors (IGBTs). Two switching elements 30 and 32 in the U phase are connected in parallel to the capacitor 10. For example, the collector of the switching element 30 is connected to one terminal of the capacitor 10, the emitter of the switching element 30 is connected to the collector of the switching element 31, and the emitter of the switching element 31 is connected to the other terminal of the capacitor 10. The switching element 32 and the switching element 33 in the V phase and the switching element 34 and the switching element 35 in the W phase are connected in the same way. The switching elements 30 to 36 are mounted on, for example, an insulated metal substrate (IMS), and are electrically connected to a flexible flat cable (FFC) connector disposed on the IMS.

The voltage of a wire connecting the switching element 30 and the switching element 31 is applied as a U-phase voltage to the motor 5. The voltage of a wire connecting the switching element 32 and the switching element 33 is applied as a V-phase voltage of the motor 5. The voltage of a wire connecting the switching element 34 and the switching element 36 is applied as a W-phase voltage of the motor 5.

The drive circuit 14 generates and outputs drive signals of the switching elements 30 to 36 of the inverter circuit 12. The drive circuit 14 amplifies drive signals input from the CPU 16 and outputs the amplified drive signals to the gates of the corresponding switching elements 30 to 36. The drive circuit 14 is mounted on, for example, a control board which is not illustrated, and is electrically connected to an FFC connector disposed on the control board. By connecting the connector of the control board and the connector of the IMS by the FFC, the inverter circuit 12 and the drive circuit 14 are electrically connected to each other.

The CPU 16 controls the entire inverter unit 1 by executing a program stored in a memory which is not illustrated. The CPU 16 generates the drive signal of each phase for each of the switching elements 30 to 36 using a carrier frequency set for each phase, and outputs the generated drive signals to the drive circuit 14. The specific operation of the CPU 16 will be described later.

The first temperature sensor 18 detects a first temperature of at least one of the switching elements 30 to 36 and the periphery of the switching elements 30 to 36. The first temperature sensor 18 is disposed, for example, in the vicinity of the switching elements 30 to 36 on the IMS on which the switching elements 30 to 36 are mounted. The first temperature sensor 18 is not particularly limited as long as it is a sensor capable of directly or indirectly detecting the temperature (the peripheral temperature) of the switching elements 30 to 36, and for example, a thermistor or a radiation thermometer can be used. The first temperature sensor 18 outputs a first temperature signal indicating the detected temperature to the CPU 16.

The first current sensor 20, the second current sensor 22, and the third current sensor 24 detect a current of the motor 5. The first current sensor 20 detects a U-phase current. The first current sensor 20 outputs a U-phase current signal indicating the U-phase current to the CPU 16. The second current sensor 22 detects a V-phase current. The second current sensor 22 outputs a V-phase current signal indicating the V-phase current to the CPU 16. The third current sensor 24 detects a W-phase current. The third current sensor 24 outputs a W-phase current signal indicating the W-phase current to the CPU 16.

The voltage sensor 26 detects a voltage of the battery 3 (a battery voltage). The voltage sensor 26 outputs a voltage signal indicating the detected voltage of the battery 3 to the CPU 16.

The fourth current sensor 27 detects a current of the battery 3. The fourth current sensor 27 outputs a current signal indicating the detected current of the battery 3 to the CPU 16.

The second temperature sensor 28 detects the temperature of at least one of the capacitor 10 and the periphery of the capacitor 10. The second temperature sensor 28 is disposed, for example, in the vicinity of the capacitor 10 on a capacitor board on which the capacitor 10 is mounted. The second temperature sensor 28 is not particularly limited as long as it is a sensor capable of directly or indirectly detecting the temperature (the peripheral temperature) of the capacitor 10, and for example, a thermistor or a radiation thermometer can be used. The second temperature sensor 28 outputs a second temperature signal indicating the detected temperature to the CPU 16.

Next, the operation of the CPU 16 will be described in detail. The CPU 16 switches the modulation mode of the motor 5 to a two-phase modulation mode or a three-phase modulation mode on the basis of the detection result of the first temperature by the first temperature sensor 18 and the detection results of the current by the first current sensor 20, the second current sensor 22, and the third current sensor 24. The CPU 16 acquires the first temperature signal output from the first temperature sensor 18 and the U-phase current signal, the V-phase current signal, and the W-phase current signal output from the first current sensor 20, the second current sensor 22, and the third current sensor 24, and switches the modulation mode to the two-phase modulation mode or the three-phase modulation mode. In the two-phase modulation mode, switching of the switching element of one phase of the U phase, the V phase, and the W phase is turned off. In the three-phase modulation mode, switching is performed by the switching elements of the three phases of the U phase, the V phase, and the W phase.

Figure 2:
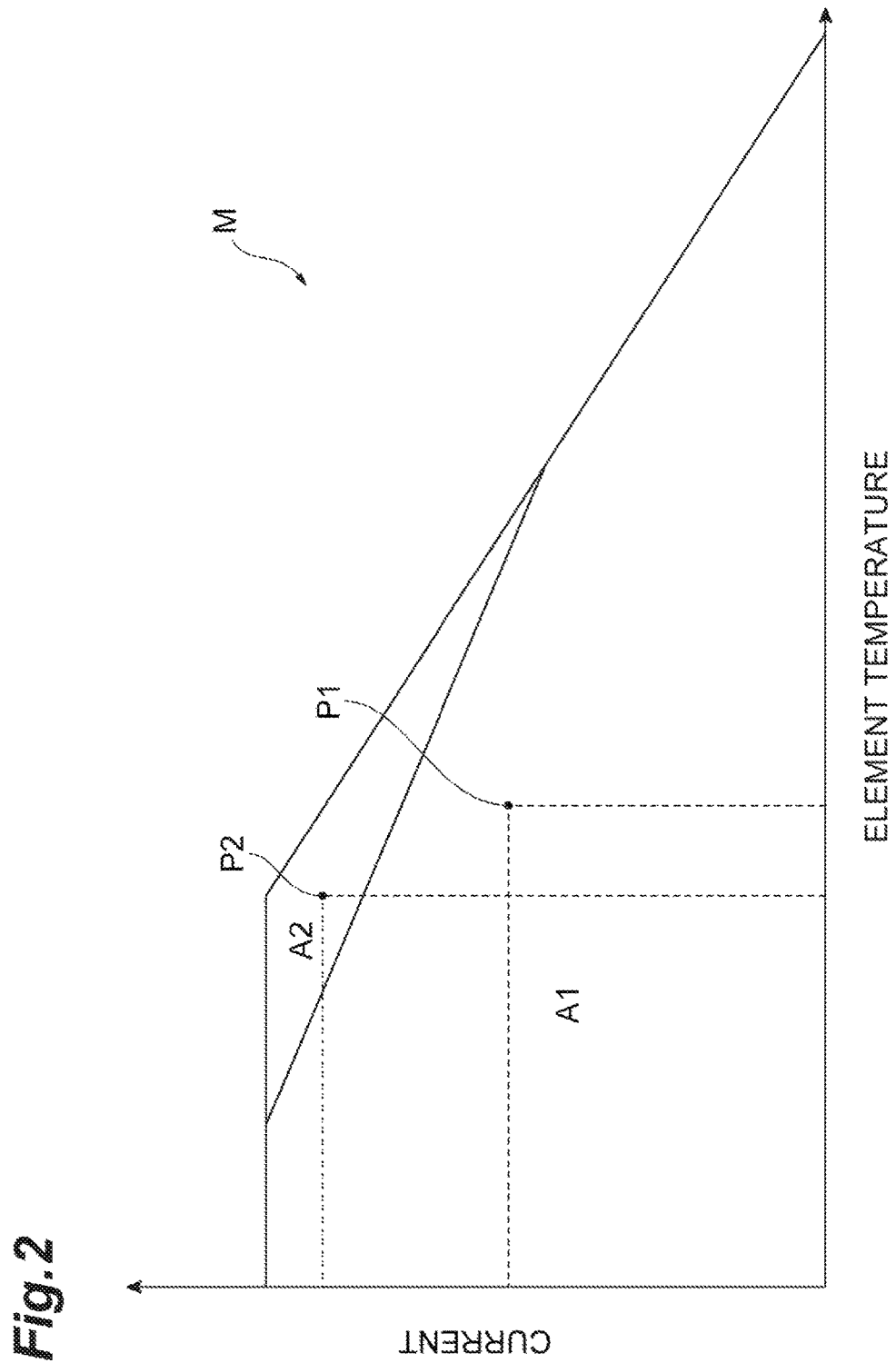
FIG. 2 is a diagram illustrating a map in which an element temperature and a current are set.

The CPU 16 selects the two-phase modulation mode or the three-phase modulation mode using a map M illustrated in FIG. 2. As illustrated in FIG. 2, in the map M, the horizontal axis represents an element temperature (the first temperature) and the vertical axis represents a current. In the map M, a three-phase modulation region A1 and a two-phase modulation region A2 are set. The three-phase modulation region A1 is a region in which the three-phase modulation mode is selected. The two-phase modulation region A2 is a region in which the two-phase modulation mode is selected. The two-phase modulation region A2 is set on the outside in the element temperature and the current with respect to the three-phase modulation region A1. The three-phase modulation region A1 and the two-phase modulation region A2 can be appropriately set depending on at least one of an experiment and characteristics of the switching elements 30 to 36.

The CPU 16 acquires the value of the first temperature from the first temperature signal and acquires a current value from the U-phase current signal, the V-phase current signal, and the W-phase current signal. The CPU 16 applies the acquired value of the first temperature and the acquired current value to the map M and sets the modulation mode. Specifically, for example, as illustrated in FIG. 2, the CPU 16 sets the modulation mode to the three-phase modulation mode when there is an intersection P1 of the value of the first temperature and the current value in the three-phase modulation region A1. The CPU 16 sets the modulation mode to the two-phase modulation mode when there is an intersection P2 of the value of the first temperature and the current value in the two-phase modulation region A2. The CPU 16 generates a carrier frequency corresponding to the set modulation mode and outputs a drive signal corresponding to the carrier frequency to the drive circuit 14.

Figure 3:
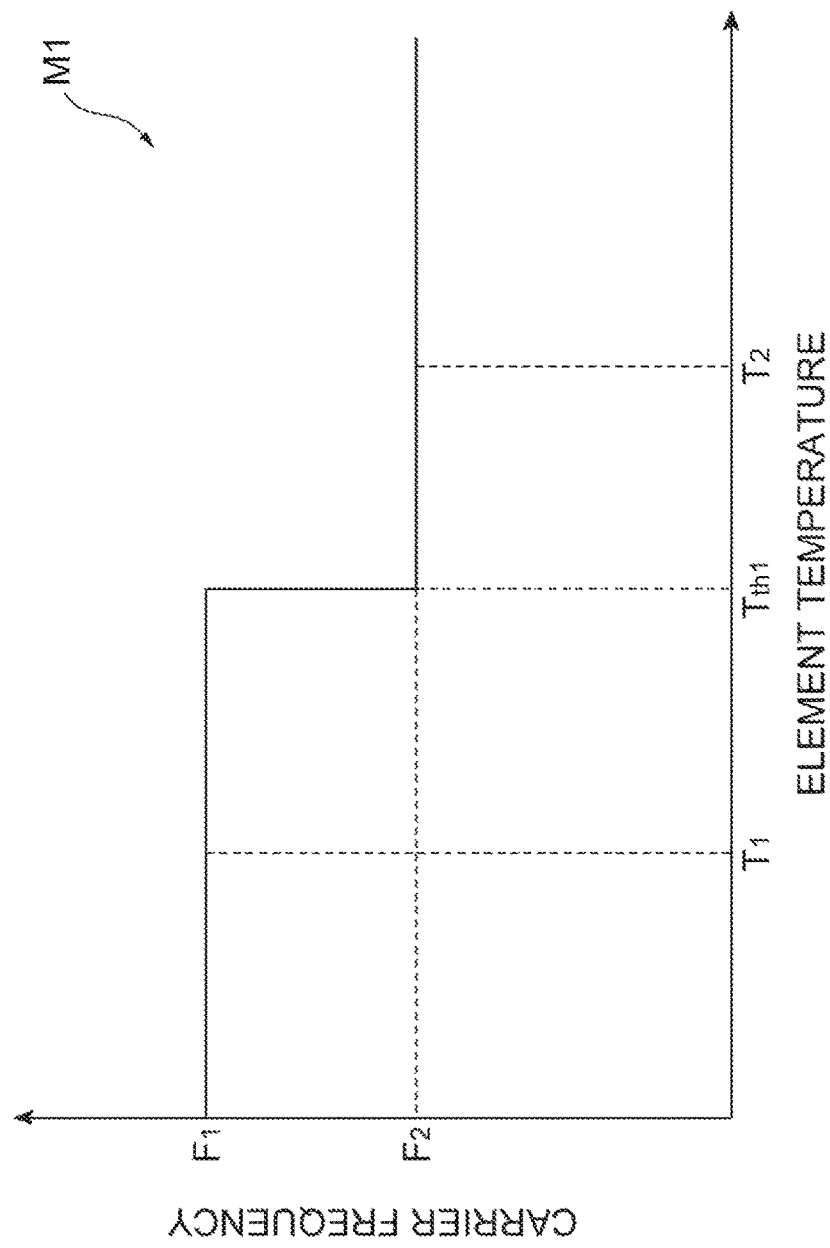
FIG. 3 is a diagram illustrating a map in which an element temperature and a carrier frequency are set.

The CPU 16 sets the carrier frequency to be lower than a reference frequency when the value of the first temperature detected by the first temperature sensor 18 is equal to or higher than a predetermined threshold value. The CPU 16 sets the carrier frequency using a map M1 illustrated in FIG. 3. As illustrated in FIG. 3, in the map M1, the horizontal axis represents the element temperature and the vertical axis represents the carrier frequency. The CPU 16 applies the acquired first temperature to the map M1 and sets the carrier frequency.

Specifically, the CPU 16 sets the carrier frequency to "$F_1$" when the value of the first temperature is "$T_1$" which is lower than the threshold value $T_{th1}$, for example, as illustrated in FIG. 3. The CPU 16 sets the carrier frequency to "$F_2$" when the value of the first temperature is "$T_2$" which is equal to or higher than the threshold value $T_{th1}$. The carrier frequency $F_1$ is a reference frequency. The reference frequency is a frequency set in advance depending on characteristics (performance) of the switching elements 30 to 36 or the like. The carrier frequency $F_1$ is higher than the carrier frequency $F_2$. The carrier frequency $F_2$ is set to be in an audible frequency band. The audible frequency band is set to, for example, a range of 20 Hz to 20 kHz. The threshold value $T_{th1}$ and the carrier frequencies $F_1$ and $F_2$ can be appropriately set depending on at least one of an experiment and characteristics of the switching elements 30 to 36. The CPU 16 outputs the drive signal corresponding to the set carrier frequency ($F_1$ or $F_2$) to the drive circuit 14. The reference frequency may be set to be separate from the carrier frequency $F_1$.

Figure 4A:
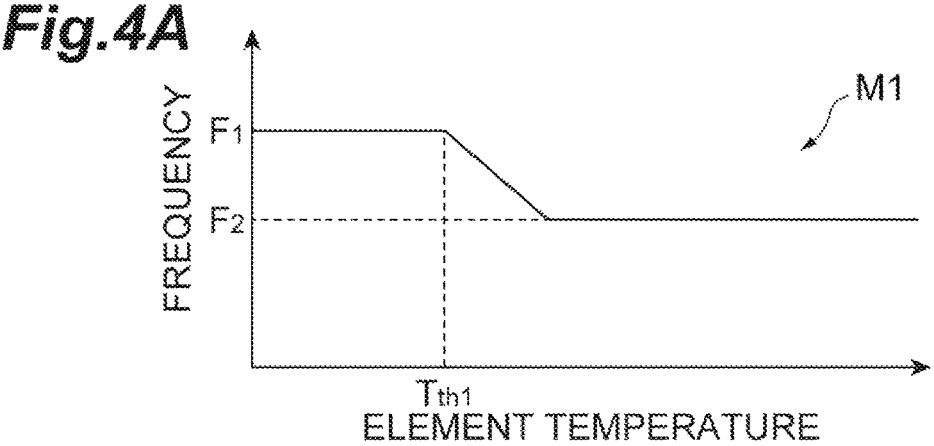
FIG. 4A is a diagram illustrating a modified example of the map illustrated in FIG. 3.
Figure 4B:
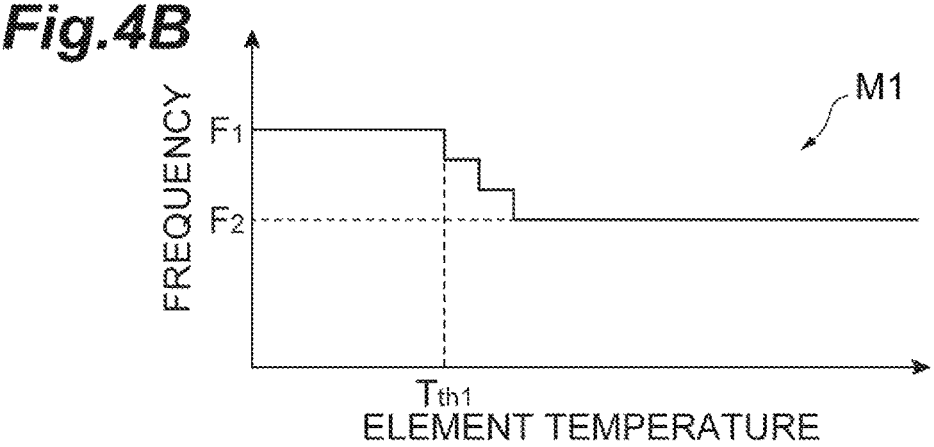
FIG. 4B is a diagram illustrating a modified example of the map illustrated in FIG. 3.
Figure 4C:
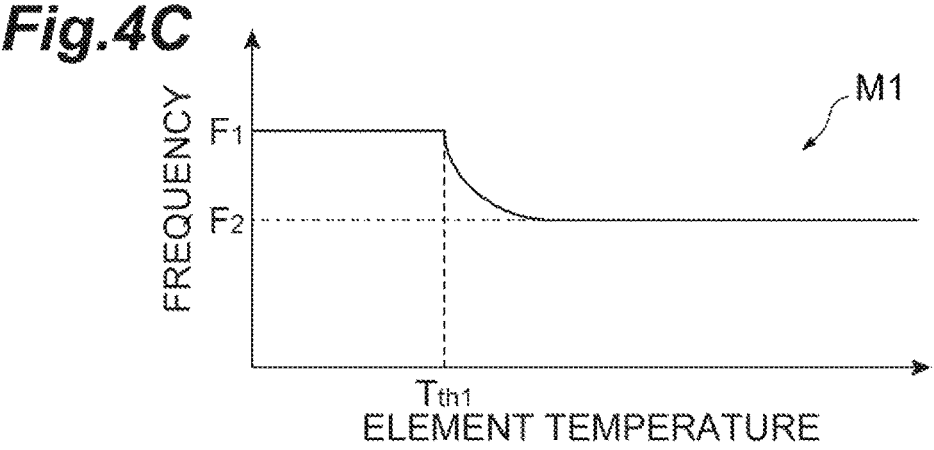
FIG. 4C is a diagram illustrating a modified example of the map illustrated in FIG. 3.

Various forms can be used for the map M1 as illustrated in FIGS. 4A to 4C. As illustrated in FIG. 4A, in the map M1, the carrier frequency may decrease linearly from the threshold value $T_{th1}$ from the carrier frequency $F_1$ to the carrier frequency $F_2$. As illustrated in FIG. 4B, in the map M1, the carrier frequency may decrease stepwise from the threshold value $T_{th1}$ from the carrier frequency $F_1$ to the carrier frequency $F_2$. As illustrated in FIG. 4C, in the map M1, the carrier frequency may decrease nonlinearly from the threshold value $T_{th1}$ from the carrier frequency $F_1$ to the carrier frequency $F_2$.

Figure 5:
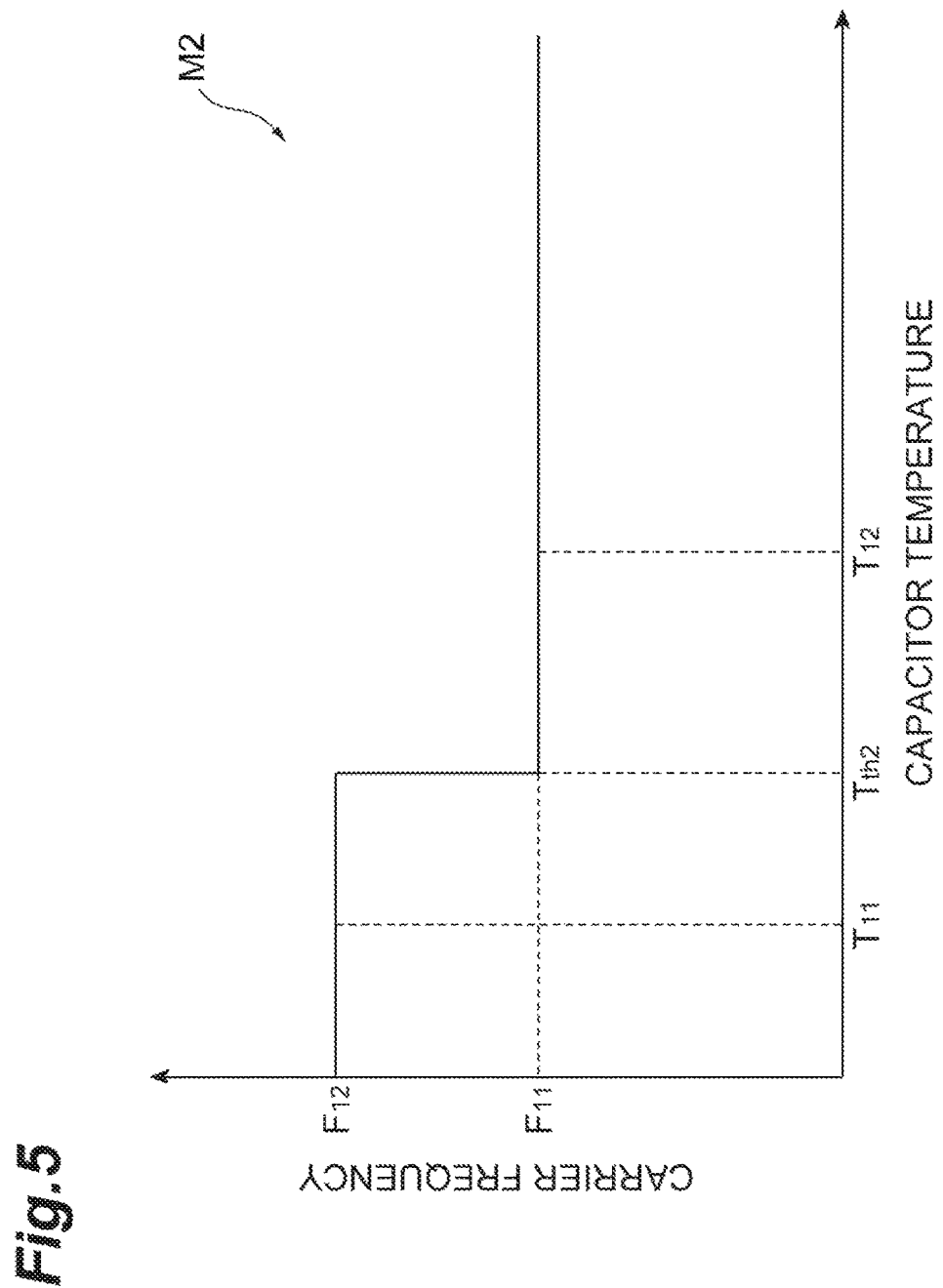
FIG. 5 is a diagram illustrating a map in which a capacitor temperature and a carrier frequency are set.

The CPU 16 sets the carrier frequency on the basis of the second temperature signal output from the second temperature sensor 28. When the second temperature signal is received, the CPU 16 acquires the value of the second temperature indicated by the second temperature signal. The CPU 16 sets the carrier frequency to be higher than the reference frequency when the value of the second temperature is equal to or higher than a predetermined threshold value. The CPU 16 sets the carrier frequency using a map M2 illustrated in FIG. 5. As illustrated in FIG. 5, in the map M2, the horizontal axis represents the capacitor temperature (the second temperature) and the vertical axis represents the carrier frequency.

The CPU 16 sets the carrier frequency to "$F_{12}$" when the value of the second temperature is "$T_{11}$" which is lower than a threshold value $T_{th2}$, for example, as illustrated in FIG. 5. The CPU 16 sets the carrier frequency to "$F_{11}$" when the value of the second temperature is "$T_{12}$" which is equal to or higher than the threshold value $T_{th2}$. The carrier frequency $F_{12}$ is higher than the carrier frequency $F_{11}$. The carrier frequency $F_{12}$ is a reference frequency. The reference frequency is a frequency set in advance depending on characteristics (performance) of the switching elements 30 to 36 or the like. The carrier frequency $F_{12}$ is set to, for example, two times the carrier frequency $F_{12}$. The carrier frequencies $F_{11}$ and $F_{12}$ can be appropriately set depending on at least one of an experiment and characteristics of the switching elements 30 to 36. The CPU 16 outputs the drive signal corresponding to the set carrier frequency ($F_{11}$ or $F_{12}$) to the drive circuit 14. The reference frequency may be set to be separate from the carrier frequency $F_{12}$.

Various forms may be used for the map M2 illustrated in FIG. 5 may, similarly to the maps M1 illustrated in FIGS. 4A to 4C.

Figure 6:
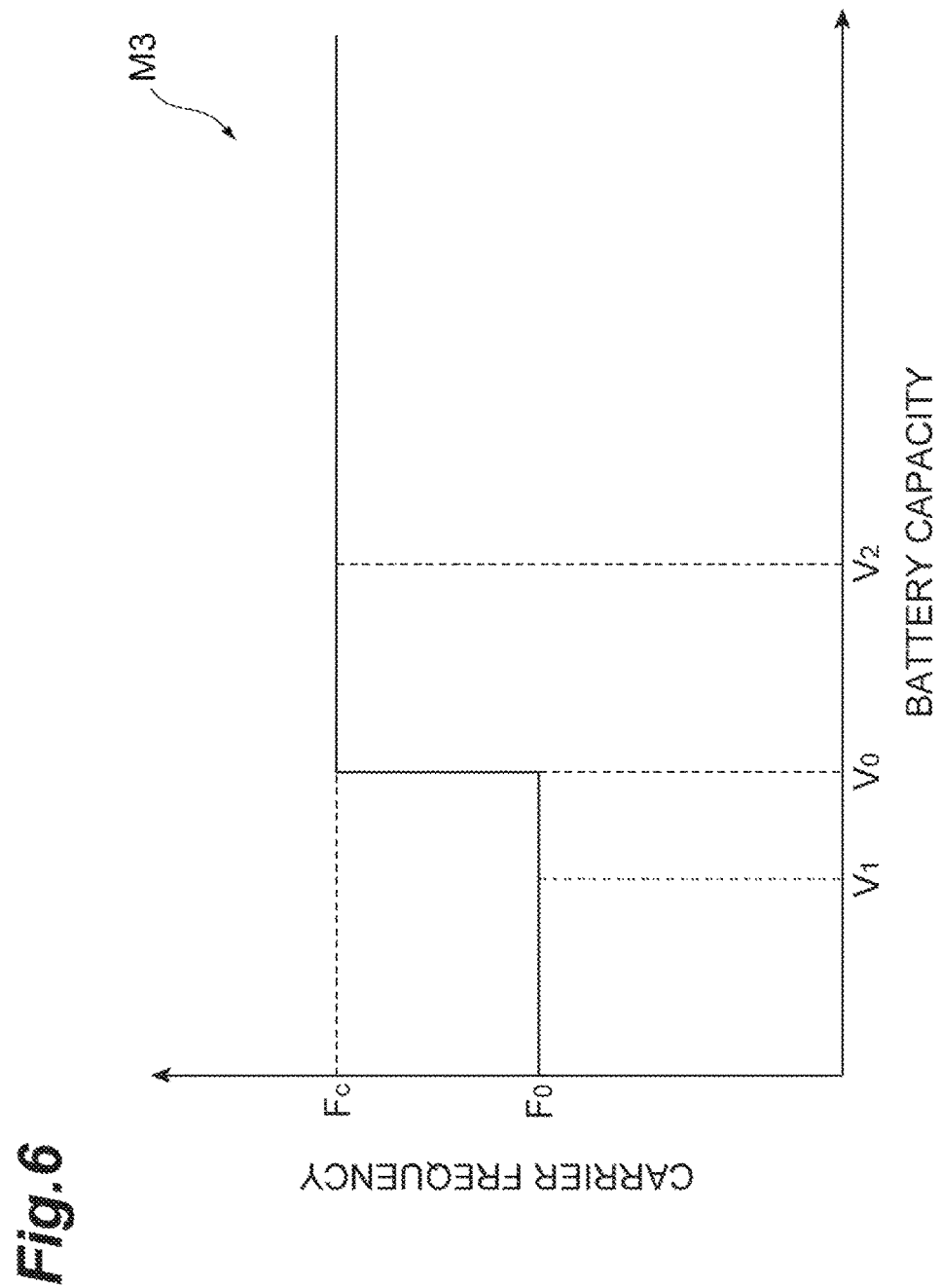
FIG. 6 is a diagram illustrating a map in which a battery capacity and a carrier frequency are set.

The CPU 16 acquires (estimates) the capacity of the battery 3 on the basis of the voltage signal output from the voltage sensor 26 and the current signal output from the fourth current sensor 27. The CPU 16 sets the carrier frequency to be lower than the reference frequency when the capacity of the battery 3 is acquired and the capacity of the battery 3 is equal to or lower than a predetermined threshold value. The CPU 16 sets the carrier frequency using a map M3 illustrated in FIG. 6. As illustrated in FIG. 6, in the map M3, the horizontal axis represents the battery capacity and the vertical axis represents the carrier frequency.

The CPU 16 sets the carrier frequency to "$F_0$" when the value of the capacity of the battery 3 is "$V_1$" which is less than a threshold value $V_0$, for example, as illustrated in FIG. 6. The CPU 16 sets the carrier frequency to "$F_C$" when the value of the capacity of the battery 3 is "$V_2$" which is equal to or greater than the threshold value $V_0$. The carrier frequency $F_C$ is higher than the carrier frequency $F_0$. The carrier frequency $F_C$ is a reference frequency. The reference frequency is a frequency set in advance depending on characteristics (performance) of the switching elements 30 to 36 or the like. The carrier frequency $F_C$ is set to be in an audible frequency band. The threshold value $V_0$ and the carrier frequencies $F_0$ and $F_C$ can be appropriately set depending on at least one of an experiment and characteristics of the switching elements 30 to 36. The CPU 16 outputs the drive signal corresponding to the set carrier frequency ($F_0$ or $F_C$) to the drive circuit 14. The reference frequency may be set to be separate from the carrier frequency $F_C$.

Various forms may be used for the map M3 illustrated in FIG. 6, similarly to the maps M1 illustrated in FIGS. 4A to 4C.

As described above, in the inverter unit 1 according to this embodiment, the first temperature of at least one of the switching elements 30 to 36 and the periphery of the switching elements 30 to 36 and the current of the motor 5 are detected. The CPU 16 switches the modulation mode of the motor to the two-phase modulation mode or the three-phase modulation mode on the basis of two parameters of the detection result of the first temperature by the first temperature sensor 18 and the detection result of the current by the first current sensor 20, the second current sensor 22, and the third current sensor 24. In the inverter unit according to the related art, when the first temperature is equal to or higher than a predetermined temperature and the current is small, the modulation mode is switched to the two-phase modulation mode and thus the output of the motor decreases. In the inverter unit 1 according to this embodiment, for example, when the first temperature is relatively high and the current is small, the motor is driven in the three-phase modulation mode. Accordingly, it is possible to maintain the output of the motor 5. In the inverter unit 1, when the first temperature increases, the modulation mode is switched to the two-phase modulation mode and it is thus possible to prevent overheating of the switching elements 30 to 36. In this way, in the inverter unit 1, it is possible to protect the switching elements 30 to 36 while securing the output of the motor 5.

In this embodiment, the CPU 16 sets the carrier frequency of the carrier signal which is used to drive the switching elements 30 to 36 to be lower than the reference frequency when the value of the first temperature detected by the first temperature sensor 18 is equal to or higher than a predetermined threshold value. By setting the carrier frequency to be lower, a loss in the switching elements 30 to 36 decreases. Accordingly, it is possible to decrease the first temperature. As a result, since control in the three-phase modulation mode can be performed, it is possible to secure the output of the motor 5.

In this embodiment, the CPU 16 may set the carrier frequency to be in an audible frequency band. When the carrier frequency is set to be in the audible frequency band, a so-called chopper sound is generated in the inverter unit 1. An operator hearing the chopper sound can see, for example, that the first temperature of the switching elements 30 to 36 is increasing. In this way, by setting the carrier frequency to be in the audible frequency band, it is possible to notify that the first temperature of the switching elements 30 to 36 is increasing. Accordingly, for example, an operator can carry out an operation in which no load is applied to the switching elements 30 to 36. As a result, it is possible to prevent overheating of the switching elements 30 to 36.

In this embodiment, the inverter unit 1 includes the capacitor 10 connected in parallel to the battery 3 on an input side of the switching elements 30 to 36 and the second temperature sensor 28 that detects the second temperature of at least one of the capacitor 10 and the periphery of the capacitor 10. The CPU 16 sets the carrier frequency to be higher than a reference frequency when the value of the second temperature detected by the second temperature sensor 28 is equal to or lower than a predetermined threshold value. When the temperature of the capacitor 10 is low, equivalent series resistance (ESR) thereof is large. Accordingly, when the temperature of the capacitor 10 is low, a smoothing effect by the capacitor 10 is reduced and thus a surge voltage at the time of switching of the switching elements 30 to 36 increases. Accordingly, the switching elements 30 to 36 may be subjected to damage or the like. In this embodiment, when the second temperature is equal to or lower than the threshold value, the carrier frequency is set to be higher. Accordingly, a loss in the switching elements 30 to 36 increases and the temperature of the switching elements 30 to 36 increases. As a result, the temperature of the capacitor 10 can be increased. Accordingly, it is possible to prevent reduction of the smoothing effect by the capacitor 10. As a result, it is possible to prevent damage or the like of the switching elements 30 to 36.

Since damage of the switching elements 30 to 36 can be prevented, switching elements 30 to 36 capable of enduring the surge voltage do not have to be used. A switching element having a high withstanding voltage is generally expensive. In this embodiment, since a switching element having a high withstanding voltage does not have to be used, it is possible to suppress an increase in cost. In order to prevent a decrease in ESR at a low temperature, increasing the size of the capacitor or connecting a plurality of capacitors in parallel can be considered. However, in this case, the cost increases and the device size increases. In this embodiment, since it is not necessary to increase the size of the capacitor 10 or the like, it is possible to suppress an increase in size of the inverter unit 1.

In this embodiment, the inverter unit includes the voltage sensor 26 and the fourth current sensor 27 that detect the capacity of the battery 3. The CPU 16 sets the carrier frequency to be lower than the reference frequency when the value of the capacity of the battery 3 detected by the voltage sensor 26 and the fourth current sensor 27 is equal to or less than a predetermined threshold value. Accordingly, when the capacity of the battery 3 decreases, it is possible to achieve reduction of the loss in the switching elements 30 to 36.

Accordingly, it is possible to prevent a decrease in the capacity of the battery 3. As a result, it is possible to achieve extension of an operating time of the battery 3.

When the capacity of the battery 3 decreases, the chopper sound can be generated by setting the carrier frequency to be in the audible frequency band. Accordingly, for example, it is possible to notify an operator that the capacity of the battery 3 is decreasing.

The present invention is not limited to the above-mentioned embodiment. For example, in the above-mentioned embodiment, the control of switching the modulation mode and the control of setting the carrier frequency of the switching elements 30 to 36 to be lower when the value of the first temperature is equal to or higher than the predetermined threshold value are performed. However, the control of setting the carrier frequency of the switching elements 30 to 36 to be lower may not be performed.

In the above-mentioned embodiment, the example in which one first temperature sensor 18 is provided has been described. However, a plurality of sensors that detect the first temperature of at least one of the semiconductor elements and the periphery of the semiconductor elements may be provided. When a plurality of sensors are provided, the first temperature may use an average temperature of the temperatures detected by the plurality of sensors or may use the highest temperature. Similarly, a plurality of second temperature sensors 28 may be provided.

In the above-mentioned embodiment, the example in which the first to third current sensors 22, 24, and 26 are provided has been described. However, two phases of the U phase, the V phase, and the W phase have only to be provided with the current sensor. When two phases of the U phase, the V phase, and the W phase are provided with the current sensor and current values of the two phases are acquired, the current value of the other phase can be acquired by calculation.

In the above-mentioned embodiment, the example in which the current values are acquired from the U-phase current signal, the V-phase current signal, and the W-phase current signal and the acquired current values are applied to the map M to set the modulation mode has been described. However, the current value may be acquired from one signal of the U-phase current signal, the V-phase current signal, and the W-phase current signal.

In the above-mentioned embodiment, the example in which an electrolytic capacitor is used as the capacitor 10 has been described, but another capacitor (for example, a film capacitor) may be used as the capacitor.

In the above-mentioned embodiment, the method of calculating the capacity of the battery 3 from the voltage detected by the voltage sensor 26 and the current detected by the fourth current sensor 27 has been described as the method of detecting the capacity of the battery 3. However, another method may be used as the method of detecting the capacity of the battery 3.

What is claimed is:

1. An inverter unit that converts direct current (DC) power from a battery into alternating current (AC) power using a semiconductor element and supplies the AC power to a motor, the inverter unit comprising:
   a first temperature detector that detects a first temperature of at least one of the semiconductor element and a periphery of the semiconductor element;
   a current detector that detects a current of the motor; and
   a controller that switches a modulation mode of the motor to a two-phase modulation mode or a three-phase modulation mode based on the first temperature of the at least one of the semiconductor element and the periphery of the semiconductor element and the current of the motor,
   wherein the controller sets a carrier frequency of a carrier signal which is used to drive the semiconductor element to be less than a reference frequency when the first temperature is greater than or equal to a first predetermined threshold value, and
   wherein the controller sets the carrier frequency to be in an audible frequency band when the first temperature is greater than or equal to the first predetermined threshold value so as to notify an operator of the inverter unit that the first temperature is increasing.

2. An inverter unit that converts direct current (DC) power from a battery into alternating current (AC) power using a semiconductor element and supplies the AC power to a three-phase motor, the inverter unit comprising:
   a first temperature detector that detects a first temperature of at least one of the semiconductor element and a periphery of the semiconductor element;
   a current detector that detects a current of the motor;
   a controller that switches a modulation mode of the motor to a two-phase modulation mode or a three-phase modulation mode based on the first temperature detected by the first temperature detector and the current detected by the current detector;
   a capacitor that is connected in parallel to the battery on an input side of the semiconductor element; and
   a second temperature detector that detects a second temperature of at least one of the capacitor and a periphery of the capacitor,
   wherein the controller sets a carrier frequency of a carrier signal which is used to drive the semiconductor element to be lower than a reference frequency when the first temperature detected is greater than or equal to a first predetermined threshold value, and sets the carrier frequency to be greater than the reference frequency when the second temperature is less than or equal to a second predetermined threshold value.

3. The inverter unit according to claim 1, further comprising a capacity detector that detects a capacity of the battery,
   wherein the controller sets the carrier frequency to be less than the reference frequency when the capacity of the battery detected by the capacity detector is less than or equal to a second predetermined threshold value.

4. An inverter unit that converts direct current (DC) power from a battery into alternating current (AC) power using a semiconductor element and supplies the AC power to a motor, the inverter unit comprising:
   a first temperature detector that detects a first temperature of at least one of the semiconductor element and a periphery of the semiconductor element;
   a current detector that detects a current of the motor; and
   a controller that switches a modulation mode of the motor to a two-phase modulation mode or a three-phase modulation mode based on the first temperature of the at least one of the semiconductor element and the periphery of the semiconductor element and the current of the motor,
   wherein the controller switches the modulation mode of the motor to the two-phase modulation mode or the three-phase modulation mode based on a map that indicates a two-phase modulation region and a three-phase modulation region in a temperature and current domain.

5. The inverter unit according to claim 4, wherein the two-phase modulation region is placed outside the three-phase modulation region in the map.

6. The inverter unit according to claim 4, wherein a current range of the two-phase modulation region is less than a current range of the three-phase modulation region.

* * * * *